United States Patent
Viano

(10) Patent No.: US 10,946,829 B2
(45) Date of Patent: Mar. 16, 2021

(54) WRAP AROUND SEATBELT

(71) Applicant: INSTITUTE FOR INJURY RESEARCH, Bloomfield Hills, MI (US)

(72) Inventor: David C. Viano, Bloomfield Hills, MI (US)

(73) Assignee: INSTITUTE FOR INJURY RESEARCH, Bloomfield Hills, MI (US)

( * ) Notice: Subject to any disclaimer, the term of this patent is extended or adjusted under 35 U.S.C. 154(b) by 135 days.

(21) Appl. No.: 16/115,332

(22) Filed: Aug. 28, 2018

(65) Prior Publication Data
US 2020/0070771 A1    Mar. 5, 2020

(51) Int. Cl.
*B60R 22/195*    (2006.01)
*B60R 22/26*    (2006.01)
*B60N 2/42*    (2006.01)

(52) U.S. Cl.
CPC ........ *B60R 22/1951* (2013.01); *B60N 2/4228* (2013.01); *B60R 22/26* (2013.01)

(58) Field of Classification Search
CPC ..... B60R 22/1951; B60R 22/26; B60R 22/02; B60R 22/023; B60R 22/022; B60N 2/4228
See application file for complete search history.

(56) References Cited

U.S. PATENT DOCUMENTS

| | | | | |
|---|---|---|---|---|
| 579,818 A | * | 3/1897 | Cooley | B60R 22/26 297/468 |
| 2,823,046 A | * | 2/1958 | Banta | B60R 22/22 297/471 |
| 3,117,818 A | * | 1/1964 | Fredericks | B60R 22/02 297/474 |
| 4,059,287 A | * | 11/1977 | Weman | B60R 22/04 280/802 |
| 6,644,723 B2 | * | 11/2003 | Motozawa | B60N 2/06 296/187.12 |

(Continued)

FOREIGN PATENT DOCUMENTS

FR    2843571 A1 * 2/2004 ......... B60R 22/1951

OTHER PUBLICATIONS

Fryar et al., Anthropometric reference data for children and adults: United States, 2007-2010. National Center for Health Statistics. Vital Health Stat 11(252). 2012.

(Continued)

*Primary Examiner* — Faye M Fleming
(74) *Attorney, Agent, or Firm* — Cantor Colburn LLP

(57) ABSTRACT

A vehicle seat and safety assembly includes a seat cushion, a seatback, and a wraparound seatbelt system to restrain an occupant in rear, side and rollover crashes. The seat cushion is connected to a vehicle floor. The seatback is connected to the seat cushion. The wraparound belt has a first strap end, a second strap end, and a strap, net or supporting body extending between the first strap end and the second strap end to direct restraining forces from an occupant through the seat to the vehicle floor or structure. The strap, net, or supporting body extends at least partially through or is integrated with the seatback and may incorporate pretensioning, load-limiting and other features to increase and control occupant restraint in non-frontal crashes.

19 Claims, 12 Drawing Sheets

(56) References Cited

U.S. PATENT DOCUMENTS

| | | | | |
|---|---|---|---|---|
| 7,469,766 B2* | 12/2008 | Guo | B60R 22/1951 | |
| | | | 180/268 | |
| 7,510,246 B2* | 3/2009 | Gruninger | B60R 22/00 | |
| | | | 297/485 | |
| 7,607,508 B2* | 10/2009 | Zhao | B60R 22/02 | |
| | | | 180/268 | |
| 2015/0239426 A1* | 8/2015 | van Mourik | B60R 22/023 | |
| | | | 297/219.1 | |
| 2017/0120861 A1* | 5/2017 | Jane Santamaria | B60R 22/12 | |

OTHER PUBLICATIONS

Mertz et al., Biomechanical and Scaling Basis for Frontal and Side Impact Injury Assessment Reference Values. Stapp Car Crash J. 60:625-657, 2016.

Mertz et al., The Hybrid III 10-Year-Old Dummy. SAE 2001-22-0014, Society of Automotive Engineers, Warrendale, PA, 2001.

Viano et al., BioRID Dummy Responses in Matched ABTS and Conventional Seat Tests on the IIHS Rear Sled. Traffic Injury Prevention 12:339-346, 2011.

Viano et al., Occupant Responses in Conventional and ABTS Seats in High-Speed Rear Sled Tests with a Normally Seated Dummy. Traffic Injury Prevention, 2;19(1):54-59, 2018.

Viano et al., Seat Strength in Rear Body Block Tests. Traffic Injury Prevention, 17:5:502-507, 2016.

Viano et al., Serious Injury in Very-Low and Very-High Speed Rear Impacts. SAE 2008-01-1485, Society of Automotive Engineers, Warrendale PA, 2008.

Viano, High Retention Seat Performance in Quasistatic Seat Tests. SAE 2003-01-0173, Society of Automotive Engineers, Warrendale, PA, 2003.

Viano, Role of the Seat in Rear Crash Safety. SAE Book, ISBN 0-7680-0847-6, Society of Automotive Engineers, Warrendale, PA, SAE R-317:1-491, 2002.

* cited by examiner

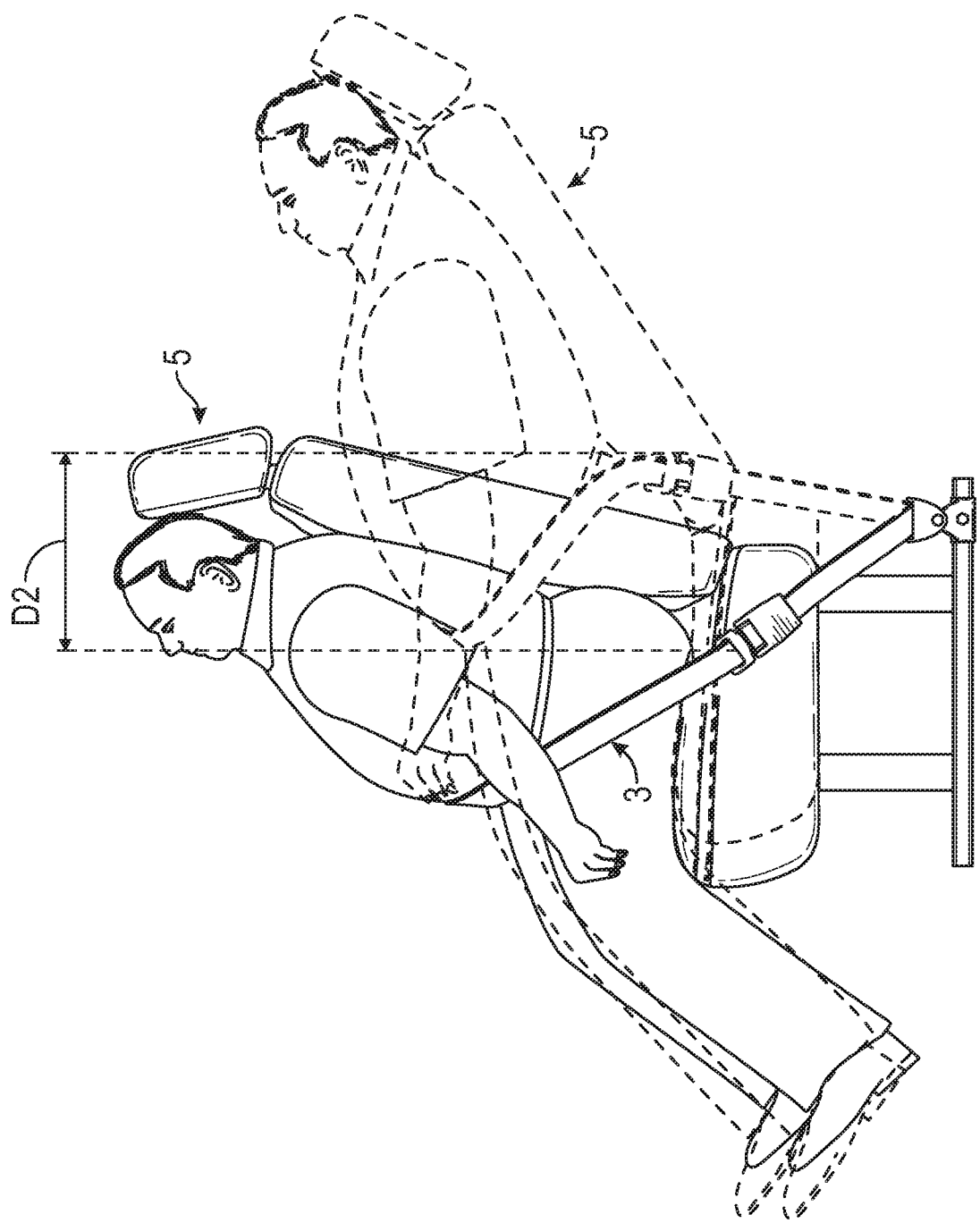

WRAP AROUND SEATBELT

BACKGROUND

Vehicle seats and seatbelts may be designed to protect an occupant during a vehicle impact such as a front, side, rear or rollover crash. A rear, side or rollover impact presents occupant protection challenges especially should the vehicle seat incorporate a recliner feature, because the lap-shoulder belt wrap forward and around the front of the occupant and the occupant may move away from the belts. Some attempts to address these challenges include using a cinching latch plate and pretensioning the belts.

Modern seats may include a perimeter frame and a pelvic catcher that allows a seat occupant to pocket into the seatback, such as in U.S. Pat. No. 5,509,716. These seats may commonly be referred to as high retention seats having a pelvic catcher (e.g. pelvic strap), which is connected to a seatback frame to support the occupant's pelvis and lower torso in a rear impact. High retention seats allow the seatback to yield rearward to gradually accelerate an occupant in a rear impact. The pocketing of the occupant improves retention of the occupant on the seat. However, in severe rear impacts or crashes with heavy occupants, the seatback rotation rearward may allow the occupant to move up the seatback even with the lap-shoulder belt buckled with pretensioning and cinching latch plate.

SUMMARY

Disclosed is a safety assembly that includes a wraparound belt that goes around the back of an occupant. The wraparound belt has a first strap end connected to an inboard seatbelt stalk that supports a seatbelt receiver, a second strap end connected to a seatbelt webbing proximate to an outboard side of a seat cushion, and a strap body extending rearward between the first strap end and the second strap end. The strap body arranged to at least one of partially extend through or be disposed on a seatback.

Also disclosed is a vehicle seatbelt assembly. The vehicle seat and safety belt assembly include a seat cushion, a seatback, lap-shoulder belts and a wraparound belt system. The seat cushion is connected to a vehicle floor. The seatback is connected to the seat cushion. The wraparound belt has a first strap end, a second strap end, and a strap body extending between the first strap end and the second strap end. The strap body extends at least partially through or is integrated with the seatback.

These and other advantages and features will become more apparent from the following description taken in conjunction with the drawings.

BRIEF DESCRIPTION OF THE DRAWINGS

The subject matter which is regarded as the invention is particularly pointed out and distinctly described in the claims at the conclusion of the specification. The foregoing and other features, and advantages of the invention are apparent from the following detailed description taken in conjunction with the accompanying drawings in which:

FIG. 4B illustrates the arc of a lap belt during a rear impact for a vehicle seat and safety belt assembly in a buckled state with a 283 lb. (129 kg) occupant;

DETAILED DESCRIPTION

Referring now to the Figures, where the invention will be described with reference to specific embodiments, without limiting the same, it is to be understood that the disclosed embodiments are merely illustrative of the invention that may be embodied in various and alternative forms. Various elements of the disclosed embodiments may be combined or omitted to form further embodiments of the invention. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure relates to seatbelts used in vehicles to restrain an occupant in a rear, side or rollover crash. Conventional lap-shoulder belts are arranged to restrain the forward movement of an occupant in a front crash. In a front impact, front structures of the vehicle may deform to facilitate decelerating of the vehicle. The seatbelts are anchored to the vehicle and the occupant moves forward in the vehicle until the displacement between the occupant and vehicle tightens the belts. The belts directly restrain the occupant by loading the pelvis with the lap belt and the shoulder/upper body by the shoulder belt with the lap and shoulder belt connected to vehicle structures. Modern vehicles use pretensioners to provide earlier restraint by tightening the belts before the occupant moves taking up slack in the belts. The belts go around the pelvis and shoulder, and pretensioning enables earlier restraint of the occupant and load-limiting controls forces.

In a rear impact, rear structures of the vehicle may deform, accelerating the vehicle forward responsive to a rear loading of the vehicle. The occupant moves rearward in the vehicle away from the lap and shoulder belts and loads the seatback. The lap belt tightens when its arc length loads the thighs after sufficient rearward movement of the pelvis. The length of the arc depends on the size of the occupant and the amount of webbing that goes forward and around the pelvis to buckle the belts. In a side or rollover crash, the occupant moves up and away from the belts providing similar challenges.

Figure 1:
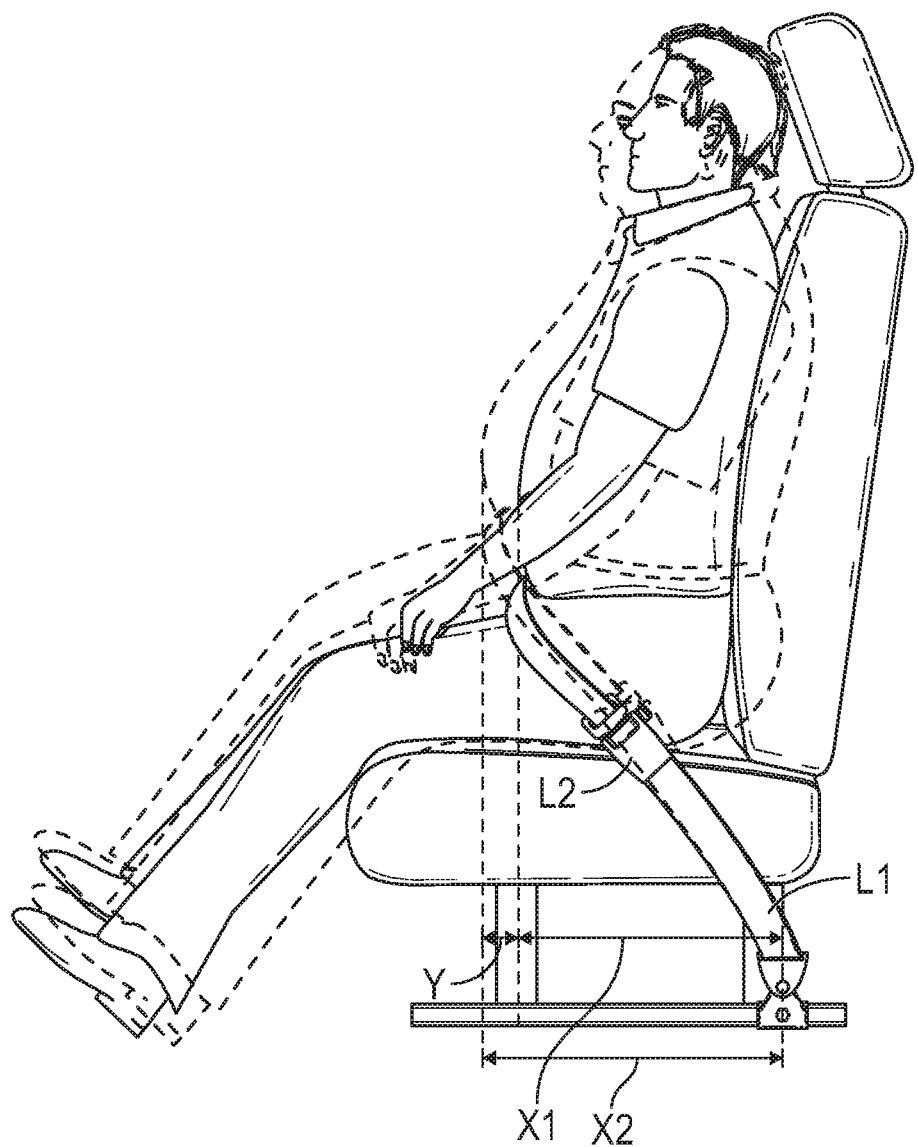
FIGS. 1 and 2 illustrate the amount of seatbelt webbing to go forward and around the pelvis and abdomen of a 50th male Hybrid III dummy and an occupant weighing 283 lb (129 kg)
Figure 2:
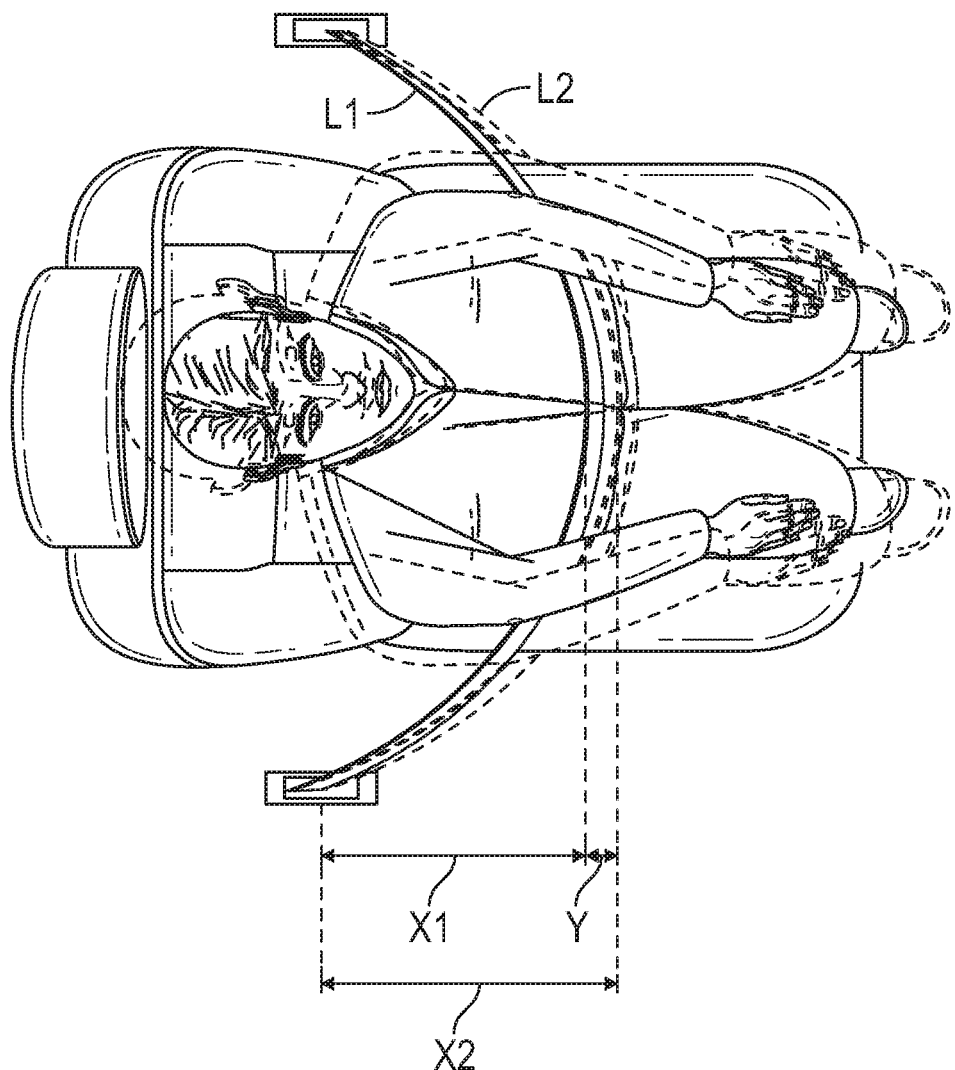

FIGS. 1 and 2 illustrate the amount of webbing to go around the pelvis and abdomen of a 50th male Hybrid III dummy and an occupant weighing 283 lb (129 kg). The length of webbing to the buckle plate was, L1, which was approximately 31.5 in (80 cm) with the 50th male Hybrid III and, L2, which was approximately 45.5 in (115.5 cm) with a heavy occupant. Additional lap belt webbing to buckle the belt on the 283 lb. (129 kg) occupant was approximately 14 in (35.5 cm). A depth, X2, of the abdomen of a heavier occupant is approximately 7 in (17.8 cm) greater, Y, than the depth, X1, of the abdomen of the 50th male Hybrid III dummy.

The amount of seatbelt webbing to go around the front of the pelvis and abdomen depends on the BMI (body mass index) of the occupant and the increase in seatbelt webbing to go around a seated occupant can be large for obese occupants. Reed et al. (see Reed M P, Ebert-Hamilton S M, Rupp J D). Effects of obesity on seat belt fit. Traffic Injury Prevention 13(4):364-72, 2012) reported a 5.8 in (14.7 cm) increase in seatbelt webbing for each 10 kg/m$^2$ increase in BMI, where BMI is defined as the occupant's weight in kilogram (kg) divided by the square of their height in meter (m) as defined by CDC (see http://www.cdc.gov/nccdphp/dnpa/bmi/adult_BMI/about_adult_BMI.htm, 2007). According to WHO (see WHO. Obesity: Preventing and Managing the Global Epidemic. Report of the WHO consultation, WHO Technical Report Series 894, Geneva, Switzerland, 2000.), Class I obesity is a BMI of 30-35 kg/m$^2$, Class II obesity is a BMI of 35-40 kg/m$^2$, and Class III is a BMI>40 kg/m$^2$. The weight and BMI of Americans has steadily increased over the years (see Flegal K M, Carroll M D, Ogden C L, Curtin L R. Prevalence and trends in obesity among US adults, 1999-2008. JAMA. 2010 Jan. 20; 303(3): 235-41).

The amount of seatbelt webbing to go around the front of the pelvis and abdomen also depends on the thickness of tissue behind the spine, which causes heavy occupants to sit forward of the seatback. The depth of the spine to back of skin is the distance from the posterior tip of vertebra to the back skin (see Parenteau C S, Zhang P, Holcombe S, Kohoyda-Inglis C, Wang S T. Analysis of Morphomics Parameters by Gender and BMI Groups: Thorax Shape and H-point Location, Proceedings of the 2013 IRCOBI Conference, Gothenburg, Sweden, 2013). It represents the fat and other tissues behind the spine in the back of the occupant. For a sample of males, the depth of the spine to back was 0.8 in (2.03 cm) for underweight, 1.1 in (2.8 cm) for normal weight, and 3.5 in (8.9 cm) for the morbidly obese. This means the pelvis is 2.4 in (6.1) more forward of the seatback with a morbidly obese occupant compared to a normal BMI occupant.

The amount of restraint provided by the lap belt in a rear, side or rollover impact depends on friction forces on the thighs, since there may be no direct loading of the lap belt onto the pelvis. Pretensioners tighten the seatbelts and reduce the arc length; but, pretensioners have a minimal effect in restraining an occupant in a severe rear impact as currently configured (see Viano D C, Parenteau C S, Burnett R. Influence of Belt Pretensioning on Dummy Responses in 40 km/h Rear Impact Sled Tests. Traffic Injury Prevention, 13(1):65-71, 2012). The influence of obesity on occupant restraint may be substantial. For example, in rear impacts the occupant moves rearward and away from the seatbelts. The lap belt routes forward and around the occupant's pelvis and abdomen. The lap belt needs to go through an arc around floor anchors as the occupant moves rearward to re-tension the belt.

Figure 3:
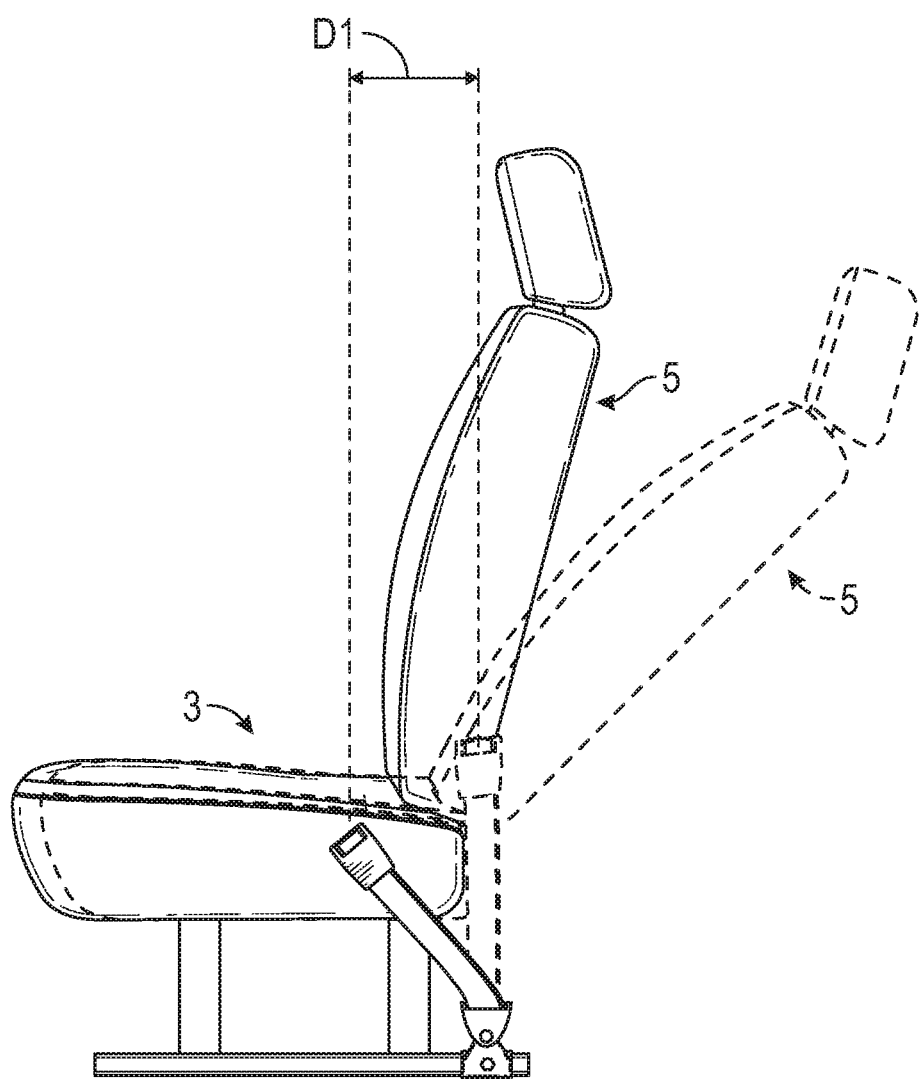
FIGS. 3 and 4A illustrate the arc of a lap belt during a rear impact for a vehicle seat and safety belt assembly in a buckled state with a 50th male Hybrid III dummy sized occupant.
Figure 4A:
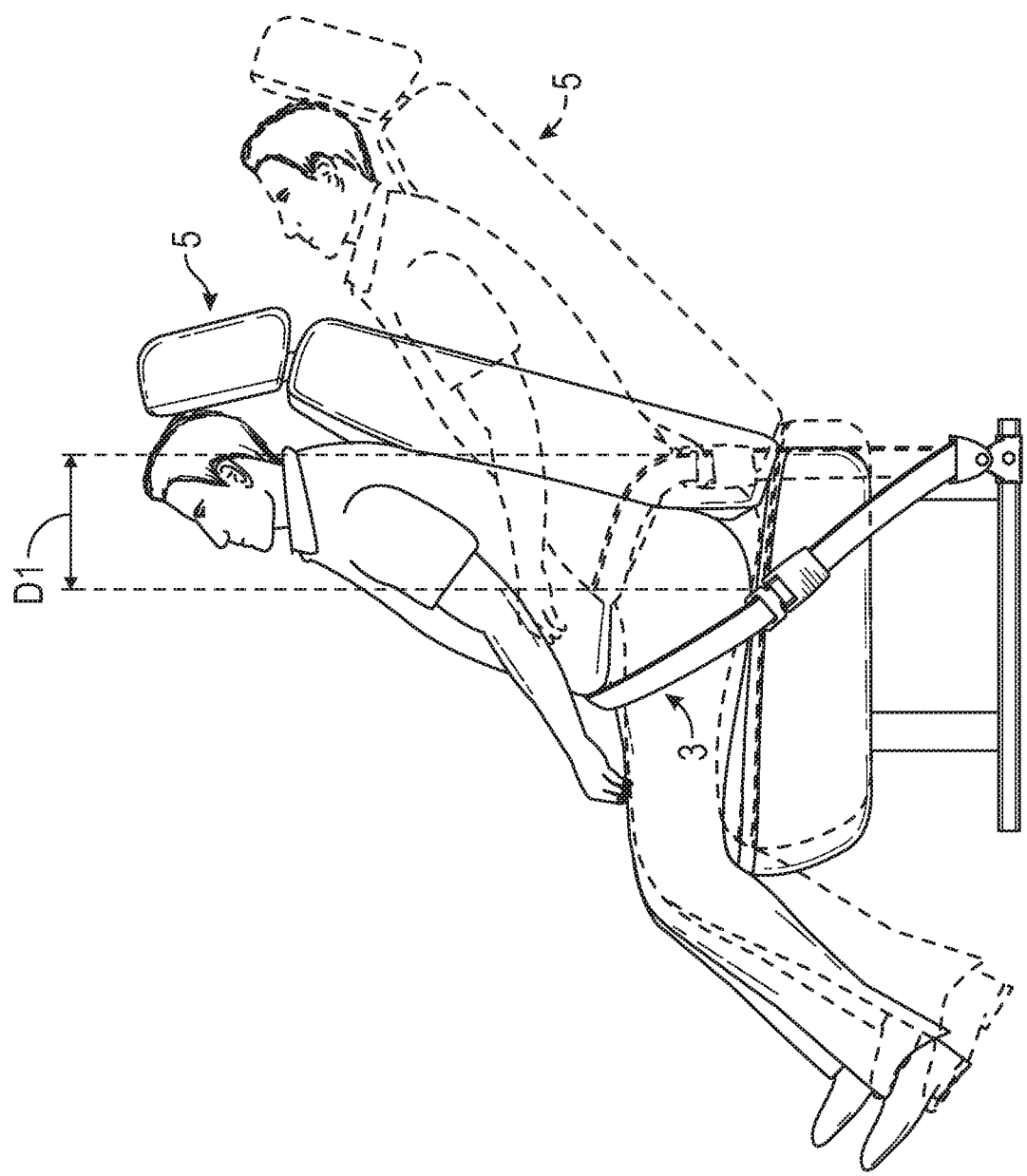
Figure 5:
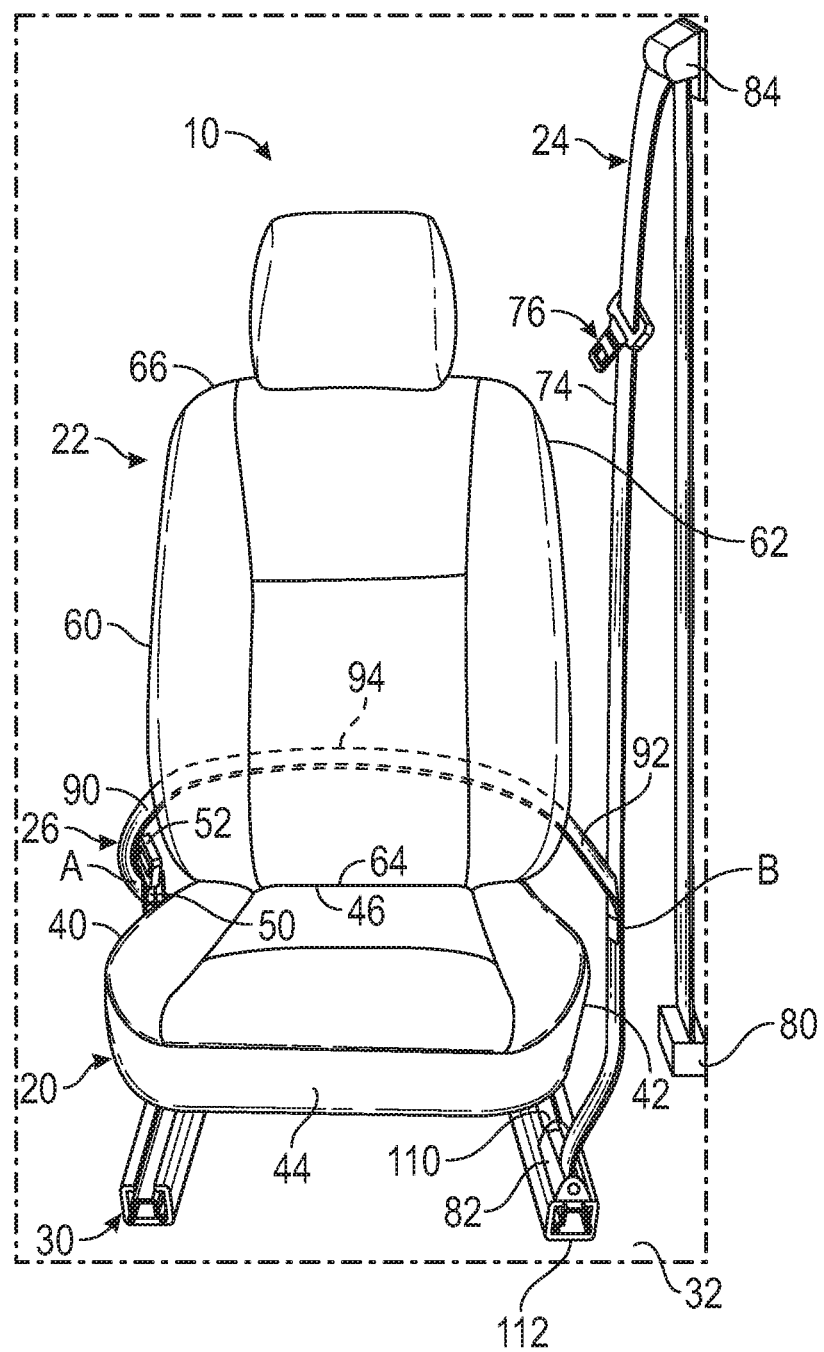
FIG. 5 is a view of a vehicle seat and wrap-around safety belt system without an occupant in an unbuckled state.

Referring to FIGS. 3 and 4A, the arc 1 of the lap belt 3 during a rear impact is illustrated. With the 50th male Hybrid III dummy, the pelvis moves, D1, 15 in (38.1 cm) rearward to re-tighten the lap belt 3 on the thighs of the occupant. Sled and crash testing show that the legs rise holding the lap belt 3 in position until it becomes tensed in a rear impact. The occupant's lap does not "slip" out of the seatbelt, but the occupant's lap moves rearward with the pelvis and provides restraint once the arc of webbing tensions and loads are applied to the thighs. With a 283 lb. (129 kg) occupant, the pelvis moves, D2, 29 in (73.6 cm) rearward to re-tighten because of the larger arc of webbing, as shown in FIG. 4B. Tension in the lap belt 3 would increase after an additional 14 in (35.5 cm) of rearward movement with the heavy occupant compared to the 50th male Hybrid III dummy.

In a severe rear impact, the occupant loads the seat 5, which yields rearward restraining rearward motion. The primary restraint of the occupant is from the seat 5. The greater the strength of the seat 5, the greater the moment on the recliners and the lower the rearward rotation of the seatback. The rearward movement of the occupant is away from the seatbelts and rotation of the seatback can allow the occupant to displace up the seatback (ramp) and off the seat 5 in some circumstances. The lap belt 3 may load the thighs but an occupant narrows from the hips to the knees limiting the amount of restraint. The amount of restraint is reduced with heavy occupants who have a large length of belt webbing to go forward and over the lap. They need to move more rearward to tighten the arc of webbing anchored to the floor or seat track compared to a normal size occupant. The amount of restraint by the lap belt 3 is limited in severe rear impacts because the lap belt 3 restrains the occupant by friction forces on the thighs.

The present disclosure provides a vehicle seat and wrap-around safety system that is arranged to directly restrain the pelvis and torso of an occupant of the vehicle seat during a rear, side or rollover crash by wrapping an additional length of seatbelt webbing rearward around the back of the pelvis and anchoring it to the seat and vehicle floor or structure. Referring to FIGS. 5-10, a vehicle seat and wrap-around safety system 10 is shown. The vehicle seat and wrap-around safety system 10 includes a vehicle seat having a seat cushion 20, a seatback 22, a seatbelt assembly 24, and a wraparound belt 26.

Referring to FIGS. 5, 6A, 6B, 9, and 10, the seat cushion 20 is secured to a vehicle floor through a mounting assembly 30. The mounting assembly 30 may facilitate the adjustment of the vehicle seat relative to the vehicle structure with a moveable upper track 34 and a lower track 36 fixed to the floor or in some embodiments simply secure the vehicle seat to the vehicle floor without facilitating adjustment. The seat cushion 20 includes a cushion trim that is disposed about portions of a cushion frame that is secured to the mounting assembly 30. The lower extremities of an occupant, such as the thigh region and pelvic region of a 5$^{th}$ percentile female or smaller through 95$^{th}$ percentile male or larger, are arranged to be disposed on and supported by the seat cushion 20.

Figure 7:
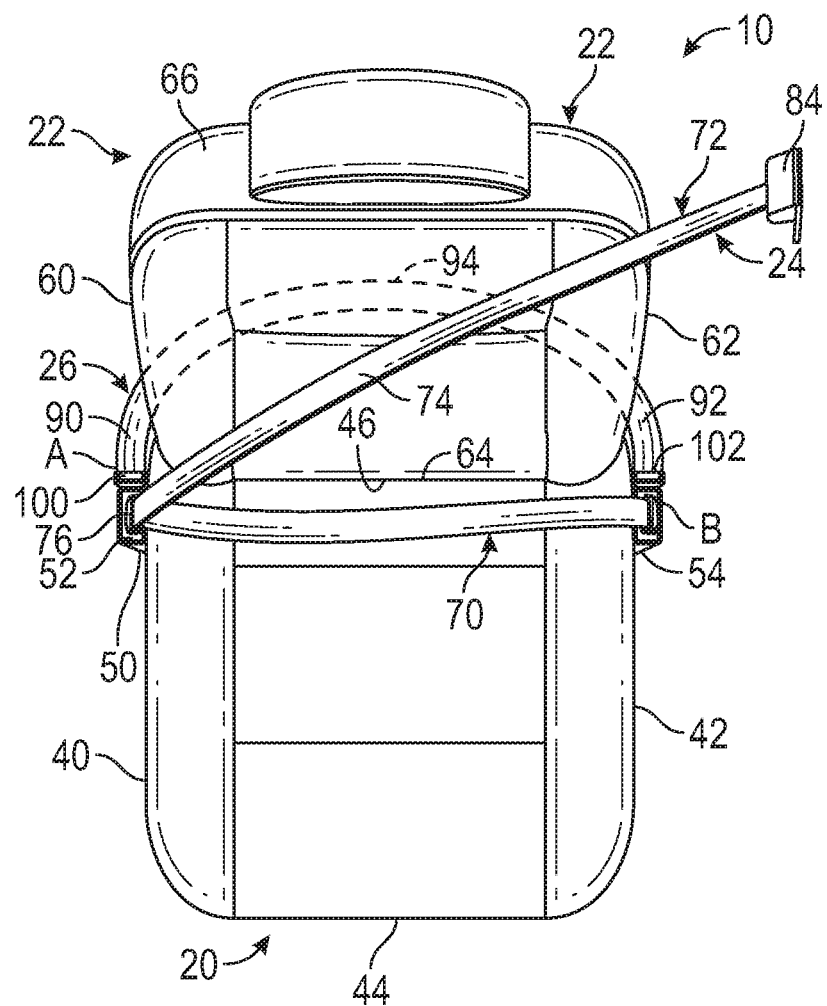
FIG. 7 is another view of the vehicle seat and wrap-around safety system without an occupant in a buckled state.

The seat cushion 20 includes an inboard side 40 and an outboard side 42, each extending between a seat cushion front 44 and a seat cushion back 46. An inboard seatbelt stalk 50 is disposed proximate the inboard side 40 of the seat cushion 20 and connected to at least one of the seat cushion 20 and the vehicle floor 32. The inboard seatbelt stalk 50 may support a seatbelt receiver 52. An outboard link 54 may be provided and is disposed proximate the outboard side 42 of the seat cushion 20, as shown in FIG. 7. The outboard link 54 may be connected to at least one of the seat cushion 20 and the vehicle floor 32. In a rear impact, the inboard seatbelt stalk 50 and outboard link 54 or connection of the wrap around belt 26 and the lap belt 70 serve as fixed points A and B for the wrap around belt 26 and support the rearward load of an occupant into the strap body 94 of the wraparound belt 26. These fixed points A and B serve as anchors to vehicle structures and may involve pretensioning and load-limiting for the restraint provided by the wraparound belt.

The seatback 22 is connected to the seat cushion 20. The seatback 22 may be pivotally connected to the seat cushion 22 a recliner assembly. The upper extremities of an occupant, such as the torso and head of a 95$^{th}$ percentile male or larger, are arranged to be disposed on and supported by the seatback 22.

The seatback 22 includes an inboard side 60 and an outboard side 62, each extending between a seatback base 64 and a seatback top 66 that supports a head rest. The seatback base 64 is disposed proximate the seat cushion back 46. The seatback 22 includes a seatback trim that is disposed about portions of the seatback frame that is secured to the cushion frame of the seat cushion 20.

The seatbelt assembly 24 is arranged to interface with the seatbelt receiver 52, to define a lap belt 70 and a shoulder belt 72 as shown in FIGS. 6-10. The seatbelt assembly 24 includes a seatbelt webbing 74 that supports a seatbelt buckle 76 that is arranged interface with or be received by seatbelt receiver 52. The seatbelt webbing 74 extends between a seatbelt retractor 80 and a seatbelt anchor 82. The seatbelt retractor 80 may be disposed on the vehicle floor 32 or may be disposed on another portion of the vehicle structure such as proximate a pillar. The seatbelt anchor 82 may be disposed on the vehicle floor 32 proximate the outboard side 42 of the seat cushion 20 or preferably it is attached to the adjustable portion of the moveable upper track 34. In at least one embodiment, the seatbelt anchor 82 may be disposed on the mounting assembly 30 or a seat track that is disposed on the vehicle floor 32. In at least one embodiment, the outboard link 54 is connected to the seatbelt anchor 82.

In at least one embodiment, the seatbelt webbing 74 extends between the seatbelt retractor 80 and the outboard link 54, a moveable portion (e.g. the moveable upper track 34) of the seat track provided with the mounting assembly 30, or the seatbelt anchor 82. The seatbelt webbing 74 may also be supported by a seatbelt support 84, such as a D-ring, that is disposed on a portion of the vehicle structure, such as the B-pillar or seatbelt integrated ABTS (all belts to seat) for front-seat occupants.

The seatbelt buckle 76 is disposed about a portion of the seatbelt webbing 74, such that when the seatbelt buckle 76 is received within the seatbelt receiver 52, the seatbelt webbing 74 at least partially defines the lap belt 70 and the shoulder belt 72.

Figure 9:
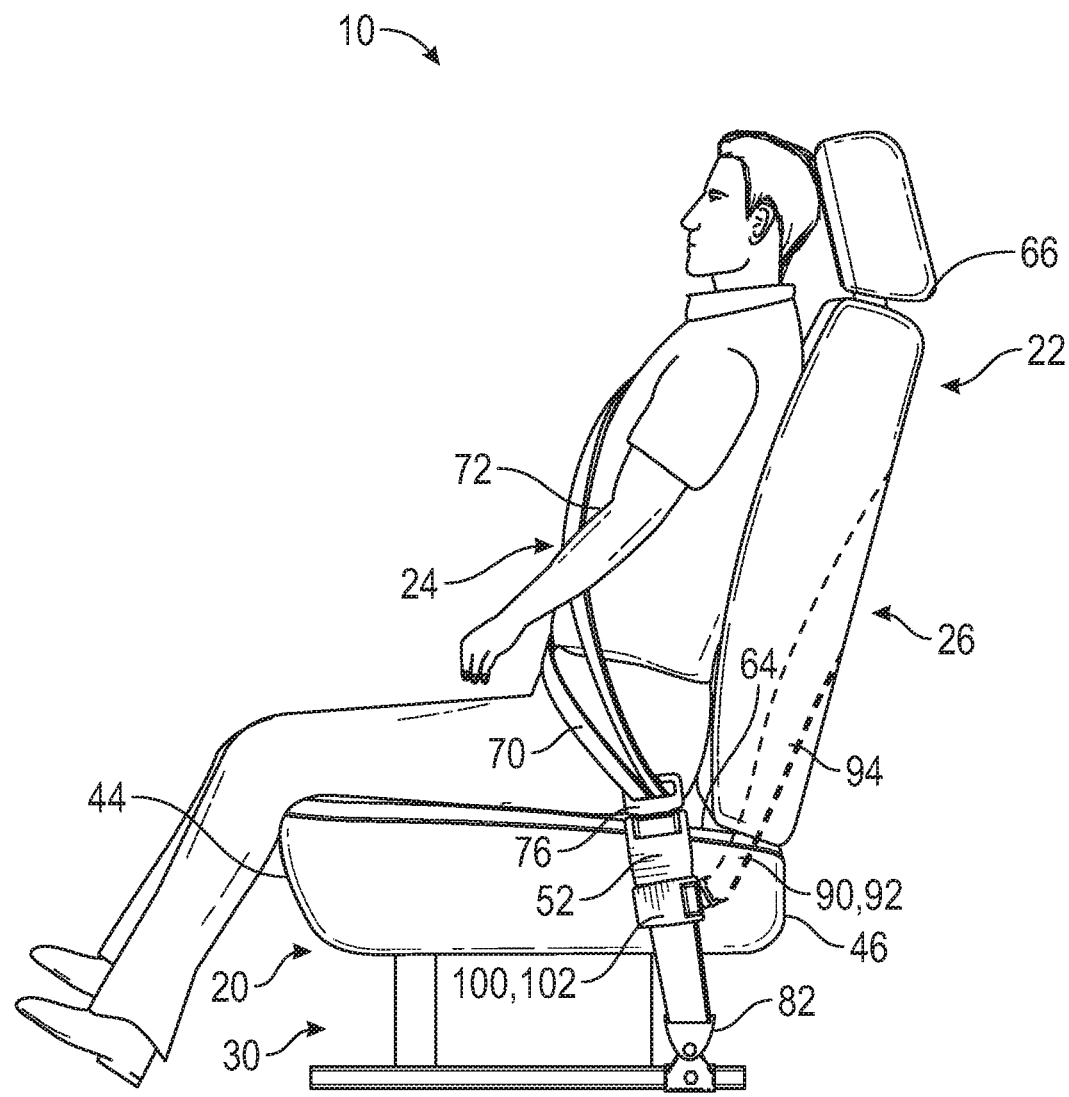
FIG. 9 is a second side view of the vehicle seat and wrap-around safety system with a 50th male Hybrid III dummy sized occupant in a buckled state.
Figure 10:
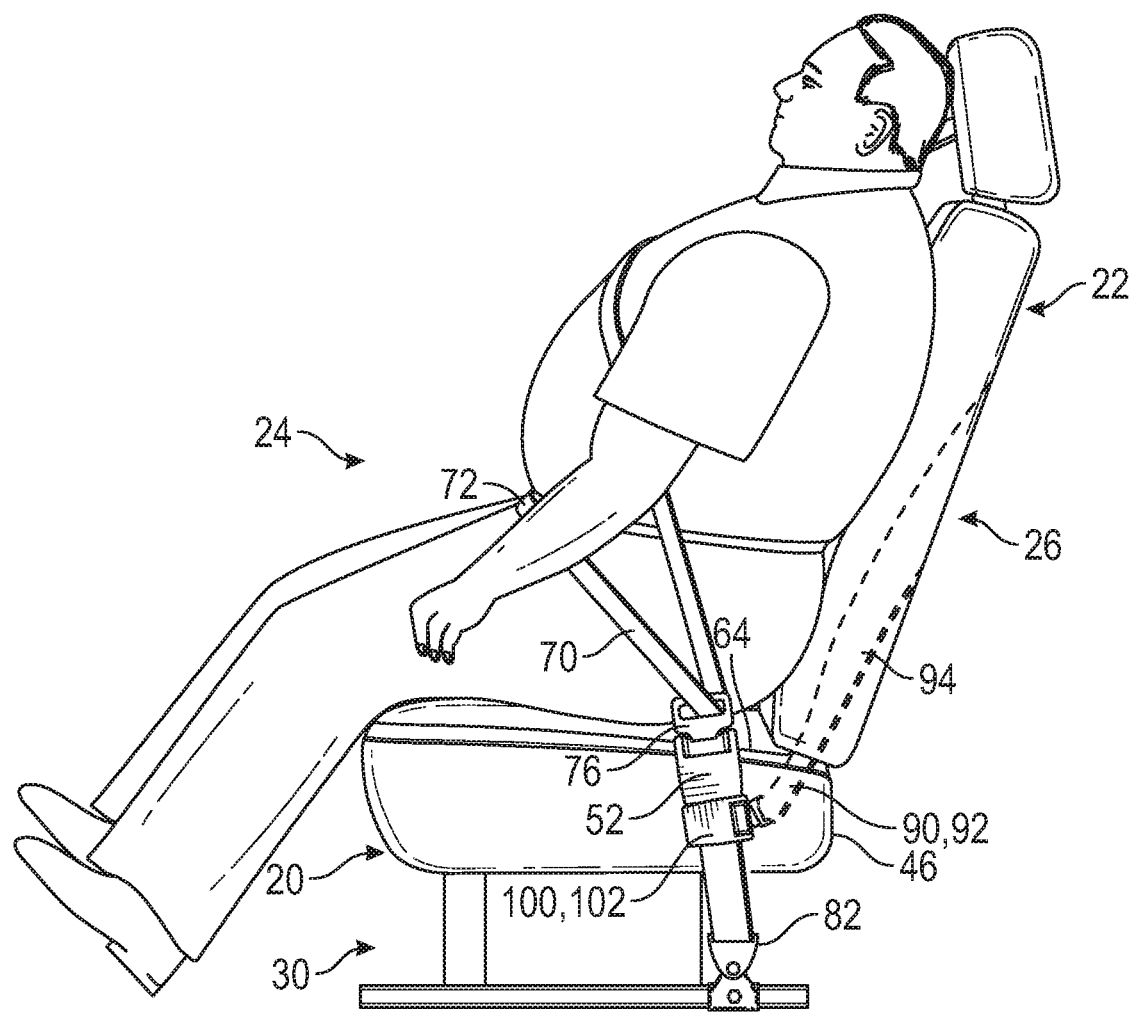
FIG. 10 is a second side view of the vehicle seat and wrap-around safety system with a 283 lb. (129 kg) sized occupant in a buckled state.

The wraparound belt 26 is arranged to wrap or be routed around the back and rear of a pelvic region of a seated occupant when the seatbelt buckle 76 engages the seatbelt receiver 52, as shown in FIGS. 7, 9, and 10. The wraparound belt 26 provides 360 degree of webbing around the pelvis of the occupant when connected to the lap belt 70 that goes around the front of the pelvis and abdomen to define a wraparound seatbelt with fixed points on at least one of the vehicle floor 32, the cushion frame of the seat cushion 22, the seat cushion 22, such that restraining loads of the wraparound seat belt are directed to at least one of the vehicle floor 32, the cushion frame of the seat cushion 22, the seat cushion 22.

The wraparound belt 26 may be made of the same material as the seatbelt webbing 74 or may be made of a different material such as a woven fabric, a net, seat trim, metal, plastic, or the like. The wraparound belt 26 may be integrated into the seatback trim of the seatback 22 such that the wraparound belt 26 is arranged as an internal loop of the seatback 22 or integrally connected to the seatback trim with sufficient area in contact with the back to prevent serious injury during restraint.

The wraparound belt 26 is connected to the seat cushion frame of the seat cushion 20 at points A and B and/or vehicle floor 32 to provide a direct or indirect connection to the vehicle floor 32 or structures. The wraparound belt 26 is connected to the seatbelt buckle 76 and the seatbelt webbing 74 of the lap belt 70 and/or the outboard link 54 to provide a ring of restraint webbing around the pelvis of an occupant. The webbing of the wraparound belt 26 provides a similar type of restraint in a rear impact as the lap belt 70 provides in frontal impacts, by directing belt loads to the movement of the vehicle floor 32 or structures.

The latching of the seatbelt assembly 24 with the added webbing of the wraparound belt 26 to the rear of the occupant provides a 360 degree ring of webbing around the pelvis to provide greater restraint in rear or oblique-rear, side and rollover crashes. The 360 degree ring of webbing around the pelvis provides restraint for impacts from the inboard side where the occupant may move away from the shoulder belt 72 and may displace out of the lap belt 70 in a severe impact, particularly with significant yaw motion. With the wraparound belt 26, the greater the severity of the rear impact or oblique inboard impact, the greater the restraint provided by the wraparound belt 26 behind the pelvis that completes a ring of restraint.

Like the lap-shoulder belt of the seatbelt assembly 24, the wraparound belt 26 provides greater protection when pretensioned, which tightens the wraparound belt 26 around the back of the occupant, and when the forces are limited by a yielding attachment to the seat cushion frame of the seat cushion 20 and the vehicle floor 32 or structures. The connection of the wraparound belt 26 to the cushion frame of the seat cushion 20 and the vehicle floor 32 or structures needs sufficient strength to restrain a large occupant in a severe rear impact.

The wraparound belt 26 includes a first strap end 90, a second strap end 92, and a wrap-around belt or strap body 94 that extends between the first strap end 90 and the second strap end 92. The area of the wrap-around belt, 94, in contact with the back and pelvis of the occupant needs to be large enough and compliant enough not to cause serious injury to the occupant in a severe rear impact.

The first strap end 90 extends from the inboard side 60 of the seatback 22. In at least one embodiment, the first strap end 90 may extend from the inboard side 40 of the seat cushion 20. The first strap end 90 of the wraparound belt 26 is connected to the inboard seatbelt stalk 50, as shown in FIGS. 5-8. In at least one embodiment, the first strap end 90 may be connected to the cushion frame of the seat cushion 20 or connected to the seatbelt receiver 52 that is connected to the inboard seatbelt stalk 50.

The second strap end 92 extends from the outboard side 62 of the seatback 22. In at least one embodiment, the second strap end 92 may extend from the inboard side 60 of the seat cushion 20. The second strap end 92 of the wraparound belt 26 may be connected to the seatbelt webbing 74 of the seatbelt assembly 24, as shown in FIGS. 5, 6A, 6B, and 8 and connected via some means to fixed point B. The connection at B may or may not be detachable. The second strap end 92 of the wraparound belt 26 may be connected to the outboard link 54, as shown in FIGS. 7, 9, and 10 and connected by some means to fixed point A. The connection at A may or may not be detachable. In at least one embodiment, the second strap end 92 may be connected to the cushion frame of the seat cushion 20.

The strap body 94 extends between the first strap end 90 and the second strap end 92. The strap body 94 extends through at least a portion of the seatback 22 such that the ends of the wraparound belt 26 extend through opposite sides of the seatback 22. The strap body 94 is arranged as a supporting body that extends at least partially through or is integrated with the seatback 22 and may incorporate pretensioning, load-limiting and other features to increase and control occupant restraint in non-frontal crashes.

Figure 6A:
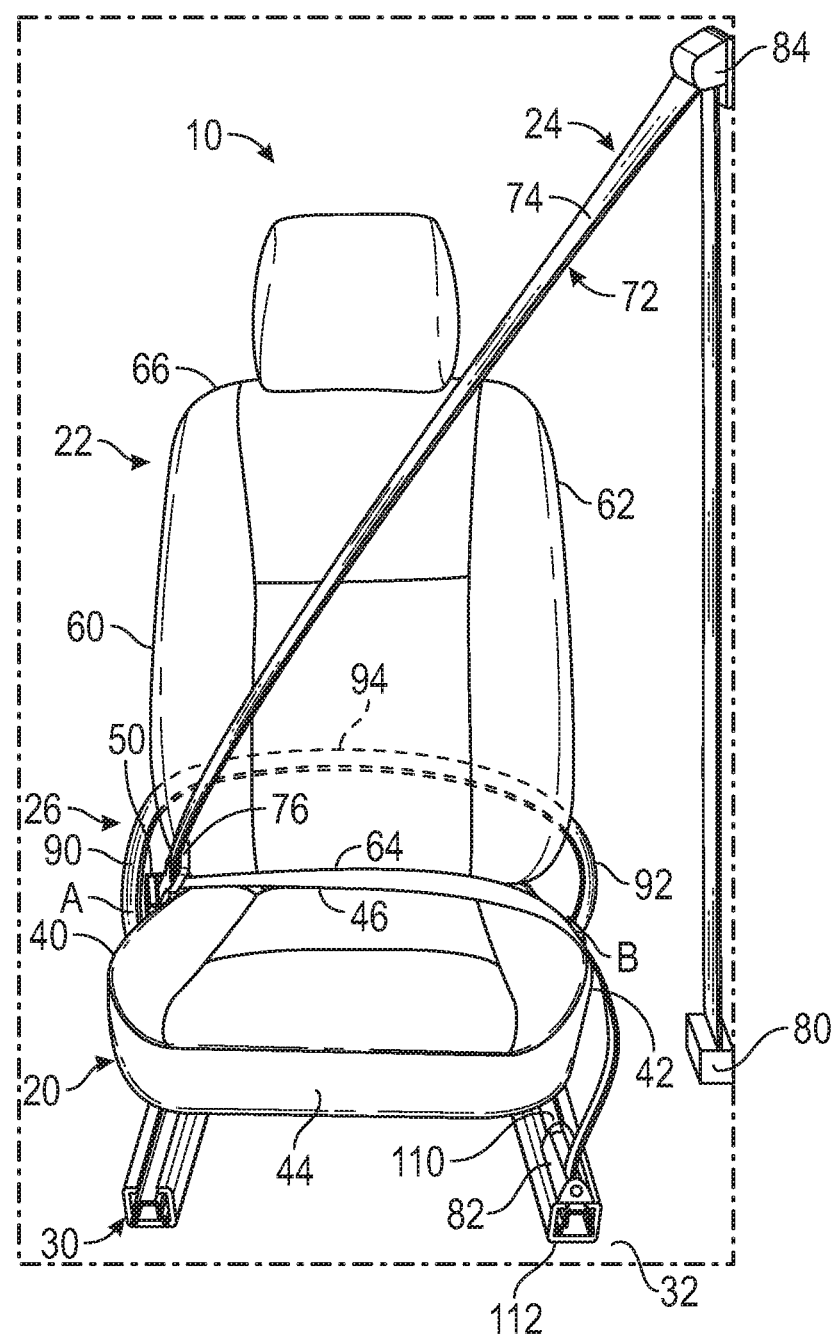
FIG. 6A is a view of the vehicle seat and wrap-around safety belt system without an occupant in a buckled state according to a first embodiment.
Figure 6B:
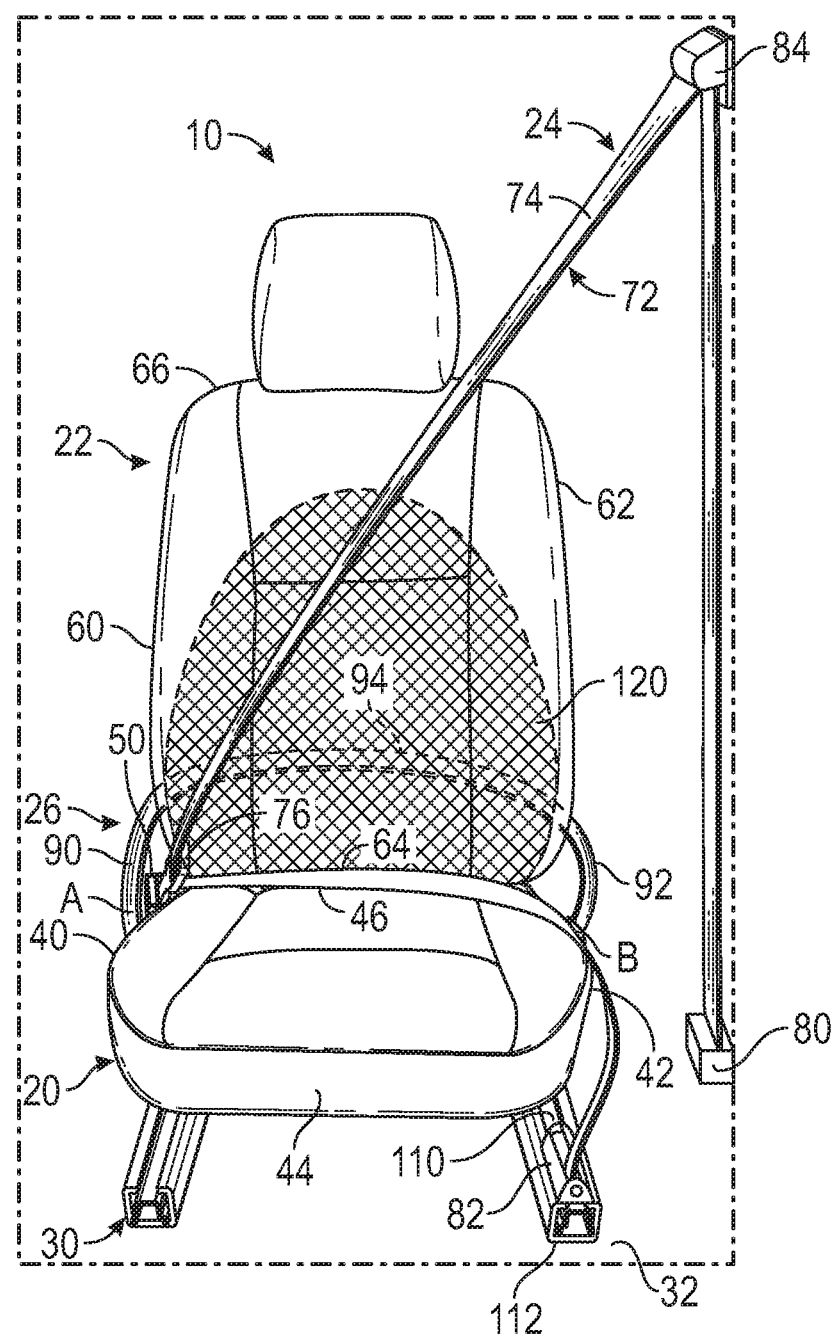
FIG. 6B is a view of the vehicle seat and wrap-around safety system transition to a net or other construction to support the back of an occupant over a larger area that may include the pelvis, back, neck and head of the occupant.

Referring to FIG. 6B, the strap body 94 of the wraparound belt 26 may transition in the seatback 22 to a net or other structure 120 with sufficient size, strength and compliance to support the pelvis, back, and may include support for the neck and head of the occupant to distribute restraint over a large area of the body. The net 120 may extend between the first strap end 90 and the second strap end 92. The net 120 may be made of a material that is arranged to support the body with a large area of pressure during restraint lowering localized forces that may be concentrated on the body.

Figure 8:
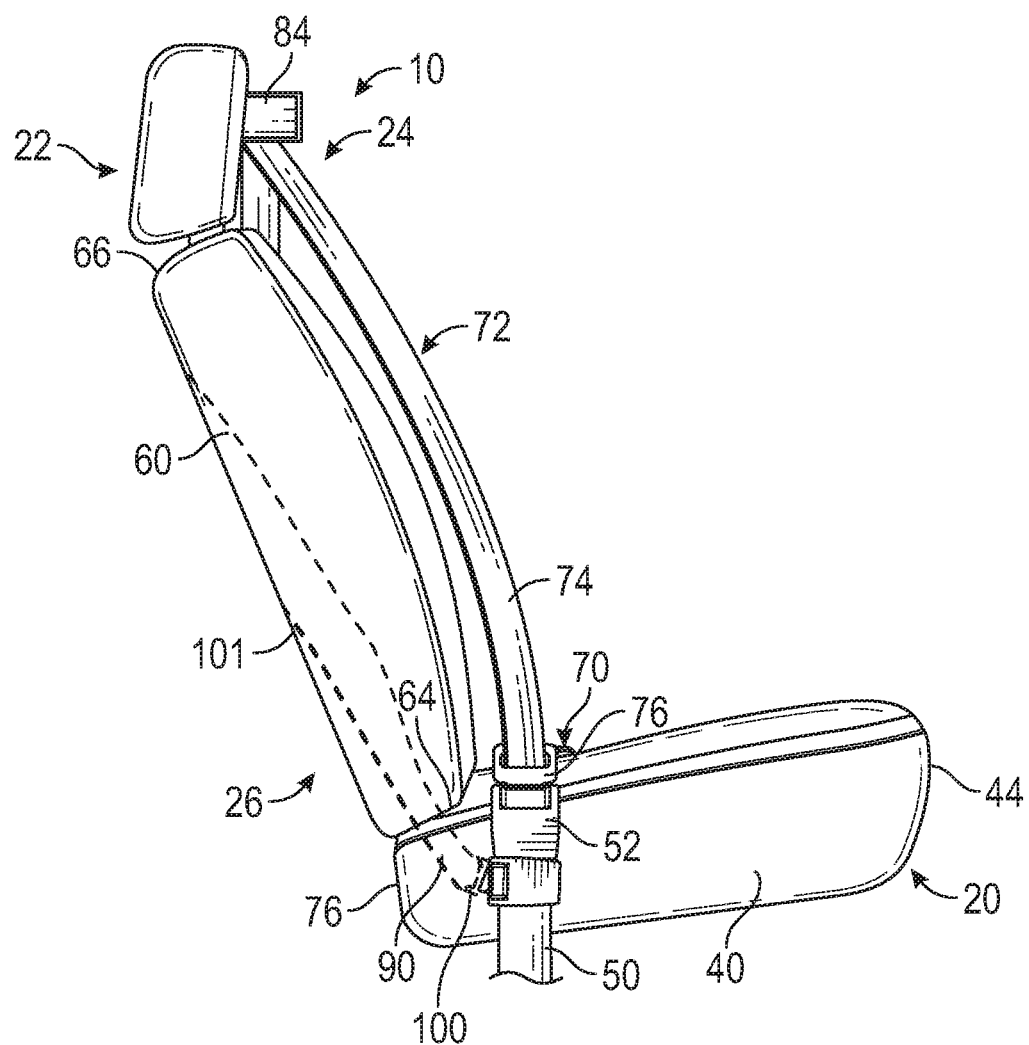
FIG. 8 is a first side view of the vehicle seat and wrap-around safety system without an occupant in a buckled state.

A first stop 100 may be disposed on at least one of the inboard side of the seat cushion 20 or the seatback 22, as shown in FIGS. 7 and 8. The first stop 100 is arranged to inhibit rotation or movement of the first strap end 90 or the strap body 94 from rotating rearward beyond a threshold angle or threshold displacement. The connection may be load limiting and may be a point of pretension the wraparound belt. The first stop 100, point B, functions as a positive stop for the first strap end 90.

A second stop 102, point A, may be disposed on at least one of the outboard side of the seat cushion 20 of the seatback 22, as shown in FIGS. 7, 9, and 10. The second stop 102 is arranged to inhibit rotation or movement of the second strap end 90 or the strap body 94 from rotating rearward beyond a threshold angle or threshold displacement. The second stop 102 functions as a positive stop for the second strap end 92.

The amount of webbing of the wraparound belt 26 that wraps around/behind the back of the occupant is similar for the 50th male Hybrid III dummy, as shown in FIG. 9, and the 283 lb. (129 kg) occupant, as shown in FIG. 10, because the back of the occupant is disposed against the seatback 22. The ends of the additional amount of webbing of the wraparound belt 26 may be attached to the frame of the seat cushion 20, the vehicle floor 32, or the inboard seatbelt stalk 50 and the lap belt 70. The connections of the wraparound belt 26 behind the occupant provides 360 degrees of belt webbing around the pelvis and abdomen of the occupant.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A safety assembly, comprising:
a wraparound belt having a first strap end connected to an inboard seatbelt stalk that supports a seatbelt receiver, a second strap end connected to a seatbelt webbing proximate an outboard side of a seat cushion, and a strap body extending between the first strap end and the second strap end, the strap body arranged to at least one of partially extend through and be disposed on a seatback.

2. The safety assembly of claim 1, wherein the seatbelt stalk is connected to at least one of a vehicle floor, a cushion frame, and the seat cushion.

3. The safety assembly of claim 1, wherein the seatbelt webbing at least partially defines a lap belt.

4. The safety assembly of claim 2, wherein the wraparound belt and the lap belt are arranged to define a wraparound seatbelt with fixed points on at least one of the vehicle floor, the cushion frame, and the seat cushion, such that restraining loads are directed to at least one of the vehicle floor or structure, the cushion frame, and the seat cushion.

5. The safety assembly of claim 4, wherein the wrap around seatbelt is arranged to wrap around a rear of a pelvic region of an occupant when a seatbelt buckle engages the seatbelt receiver.

6. A vehicle seat and safety assembly arranged to use pretensioning and load limiting features to increase and control occupant restraint in rear, side and rollover crashes, comprising:
a seat cushion connected to a vehicle floor;
a seatback connected to the seat cushion; and
a wraparound belt having a first strap end, a second strap end, and a strap body extending between the first strap end and the second strap end, the strap body extending at least partially through or integrated with the seatback, wherein the first strap end is connected to an inboard seatbelt stalk that supports a seatbelt receiver, the inboard seatbelt stalk is disposed proximate an inboard side of the seat cushion.

7. The vehicle seat and safety assembly of claim 6, wherein the first strap end is detachably connected to the inboard seatbelt stalk.

8. The vehicle seat and safety assembly of claim 6, wherein the inboard seatbelt stalk is connected to at least one of the vehicle floor and the seat cushion.

9. The vehicle seat and safety assembly of claim 6, wherein the second strap end is connected to an outboard link disposed proximate an outboard side of the seat cushion.

10. The vehicle seat and safety assembly of claim 9, wherein the outboard link is connected to at least one of the vehicle floor or structure and the seat cushion.

11. The vehicle seat and safety assembly of claim 6, wherein the second strap end is connected to a seatbelt webbing that supports a seatbelt buckle.

12. The vehicle seat and safety assembly of claim 11, wherein the seatbelt webbing extends between a seatbelt retractor and an anchor disposed on at least one of the vehicle floor or structure and a moveable portion of a seat track proximate a second side member.

13. The vehicle seat and safety assembly of claim 11, wherein the seatbelt webbing at least partially defines a lap belt.

14. The vehicle seat and safety assembly of claim 13, further comprising a first stop disposed on at least one of the seat cushion and the seatback, the first stop arranged to inhibit rotation of the first strap end beyond a threshold angle.

15. The vehicle seat and safety assembly of claim 14, wherein the first stop is detachably disposed on at least one of the seat cushion and the seatback.

16. The vehicle seat and safety assembly of claim 13, further comprising a second stop disposed on at least one of the seat cushion and the seatback, the second stop being arranged to inhibit rotation of the second strap end beyond at least one of a threshold angle or a threshold displacement.

17. The vehicle seat and safety assembly of claim 16, wherein the second stop is detachably disposed on at least one of the seat cushion and the seatback.

18. The vehicle seat and safety assembly of claim 13, wherein the wraparound belt and the lap belt are arranged to define a wraparound seatbelt that is arranged to wrap around a rear of a pelvic region of an occupant when the seatbelt buckle engages a seatbelt receiver.

19. The vehicle seat and safety assembly of claim 6, wherein the strap body transitions to a net in the seatback.

* * * * *